(No Model.)
W. H. DOANE.
Pulley.
No. 237,833.  Patented Feb. 15, 1881.
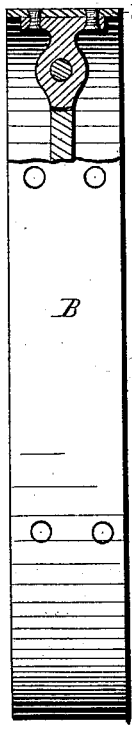
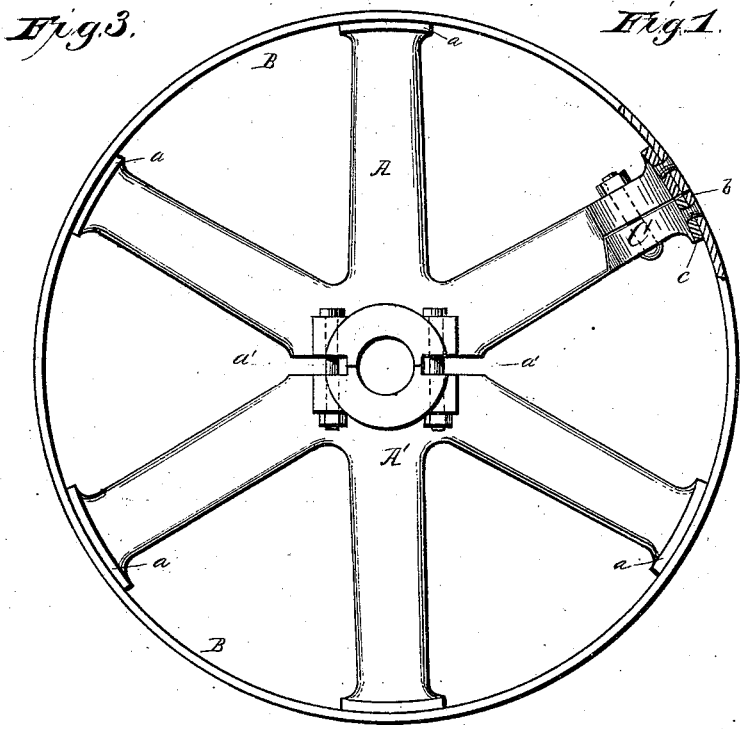
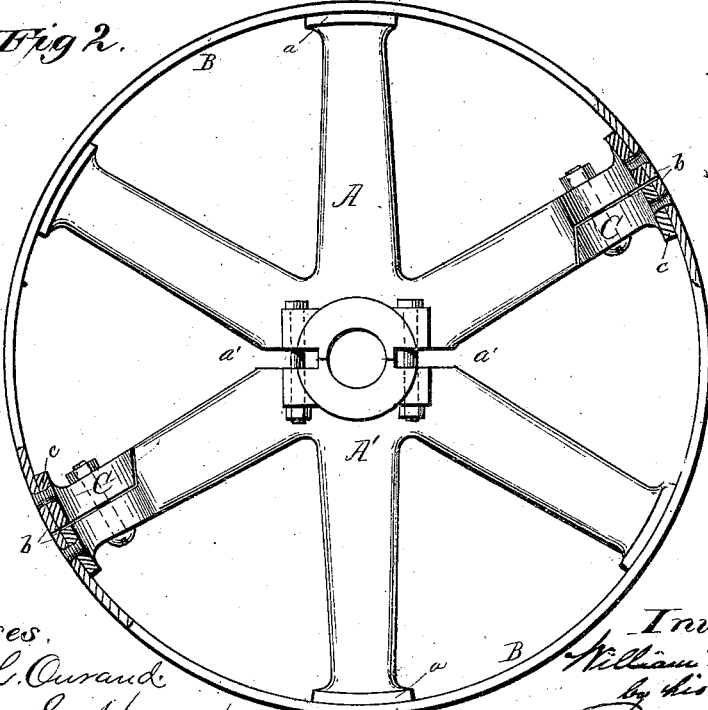
Witnesses.
Franck L. Ourand.
Chas. S. Hyer.
Inventor.
William H. Doane
by his attorneys
Gibs & Doolittle
N. PETERS, PHOTO-LITHOGRAPHER, WASHINGTON, D. C.

UNITED STATES PATENT OFFICE.

WILLIAM H. DOANE, OF CINCINNATI, OHIO.

PULLEY.

SPECIFICATION forming part of Letters Patent No. 237,833, dated February 15, 1881.

Application filed January 22, 1881. (No model.)

*To all whom it may concern:*

Be it known that I, WILLIAM H. DOANE, a citizen of the United States, residing at Cincinnati, in the county of Hamilton and State of Ohio, have invented certain new and useful Improvements in Pulleys; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to pulleys constructed with a divided spider and a split rim, and adapted to have the meeting ends of the split rim and the divided spider spread apart or separated, so that the pulley may be applied laterally to a shaft while so spread apart or separated, and afterward drawn or put together again and fixed on the shaft.

My improvement consists in securing the meeting ends of the rim respectively to a flange forming an integral part of an arm of the spider, and a flange on a bar bolted to said arm. One of the advantages of this construction is that the pulley may be opened at the rim or separated, as the case may be, without necessitating the removal of the rivets or bolts from either of the meeting ends of the rim.

Figure 1 is a face view of a pulley embodying one form of my invention. Fig. 2 is a similar view, showing a pulley constructed in accordance with another form of my invention. Fig. 3 is a side view, partly in section, of one of these pulleys.

The same letters of reference are used in all the figures in the designation of identical parts.

The spider of the pulley, which is preferably made of cast metal, consists, in the main, of two parts, A and A', each part containing one-half of the radially-divided hub, and one-half of the arms. The half-hubs are constructed with flanges provided with bolt-holes, so that they may be bolted together to properly clasp a shaft. It will be understood that the half-hubs may be, and usually will be, slightly less than a half-circle in cross-section.

The rim B, made of wrought-iron or steel, in the pulley shown in Fig. 1, is split across or separated at *b*. It is drawn tightly around the flanges *a* formed on the ends of the arms, as usual, and preferably riveted to said flanges.

The split should be arranged in line with or in close proximity to one of the arms, and one of the meeting ends of the rim is riveted or bolted to the flange of the said arm. The other meeting end of the rim is riveted or bolted to the flange *c* of a bar, C, which is, in turn, bolted to the adjacent arm. In the examples illustrated the flanged bar C forms a section of the arm to which it is bolted. I prefer this construction because it makes the arm at which the split occurs uniform, or nearly so, with the other arms of the pulley, and is, moreover, little liable to disturb the balance of the pulley. However, the bar C may be a separate bar—that is to say, not a section of the arm—as will be readily understood.

The pulley shown in Fig. 1 has, as described, a split rim, and hence requires to be spread apart in slipping it crosswise on a shaft. In pulleys of considerable diameter the spring of the rim is sufficient to admit of a separation of the rim, and the two parts of the spider great enough to form a passage-way for a heavy shaft to the interior of the hub; but in the case of small pulleys, or in the case where a pulley has to be applied to a large-sized shaft, the mere spring is inadequate. In such cases I divide the rim into two halves, and secure the meeting ends of such two halves to the arms of the spider in the same manner as the meeting ends of the split rim are secured, all as clearly shown in Fig. 2.

The spider A A' is made in one casting, suitable cores being inserted in the mold, at opposite sides of and a little distance from the hub-core, so that when the casting comes from the mold it will only be united by two thin webs at the opposite sides of the hub. By then driving a wedge in one of the spaces *a'* formed by the cores, the web uniting the two sections of the spider can be readily broken. The sections are then connected by bolts, as described, and the hub bored out true, and the faces of the hub turned down and finished.

I have heretofore described a pulley composed of a cast-metal spider formed of two sections, and having a rim bolted or riveted to the same. It will be understood, however, that the separable pulley shown in Fig. 2 may be made entirely of cast metal, the rim B being cast with the half-hubs and their arms and the bars C. In making the pulley entirely of cast metal suitable cores should also be used to separate the bars C and rim of each section from those of the other.

What I claim as my invention is—

1. A separable pulley, the meeting ends of the wrought or steel rim of which are secured, respectively, to an arm of the spider and to a bar in turn secured to said arm.

2. The combination, substantially as before set forth, of the split or divided wrought-iron or steel rim, the divided spider, and a bar attached to one end of the rim for securing it to the adjacent arm of the spider, to which the other end of the rim is attached.

3. As an improved article of manufacture, the within-described pulley, consisting of a wrought-iron or steel split rim and two independent internal split or divided sections composing the arms and hub, one of the arms of which is constructed with a detachable portion near the rim.

In testimony whereof I affix my signature in presence of two witnesses.

W. H. DOANE.

Witnesses:
C. A. NEALE,
F. L. OURAND.